(12) United States Patent
Keutz et al.

(10) Patent No.: US 7,097,197 B2
(45) Date of Patent: Aug. 29, 2006

(54) ASSEMBLY OF A STEERING WHEEL BASE BODY AND GAS BAG MODULE

(75) Inventors: Markus Keutz, Rossdorf (DE); Ralf Scherer, Aschaffenburg (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 316 days.

(21) Appl. No.: 10/686,217

(22) Filed: Oct. 15, 2003

(65) Prior Publication Data

US 2004/0075249 A1 Apr. 22, 2004

(30) Foreign Application Priority Data

Oct. 15, 2002 (DE) .......................... 202 15 836 U
Dec. 4, 2002 (DE) .............................. 102 56 595

(51) Int. Cl.
*B60R 21/203* (2006.01)
(52) U.S. Cl. .................................. 280/728.2; 280/731
(58) Field of Classification Search .. 200/61.54–61.57; 280/728.2, 731

See application file for complete search history.

(56) References Cited

U.S. PATENT DOCUMENTS

| | | | | |
|---|---|---|---|---|
| 5,333,897 | A * | 8/1994 | Albers et al. ............ | 280/728.2 |
| 5,380,037 | A * | 1/1995 | Worrell et al. ........... | 280/728.2 |
| 5,636,858 | A * | 6/1997 | Niederman et al. ...... | 280/728.2 |
| 5,775,725 | A * | 7/1998 | Hodac et al. ............. | 280/728.2 |
| 6,036,223 | A * | 3/2000 | Worrell et al. ............. | 280/731 |
| 6,082,758 | A * | 7/2000 | Schenck ................... | 280/728.2 |
| 6,092,832 | A | 7/2000 | Worrell et al. | |
| 6,276,711 | B1 * | 8/2001 | Kurz et al. .............. | 280/728.2 |
| 6,474,682 | B1 * | 11/2002 | Ikeda et al. ................. | 280/731 |
| 6,675,675 | B1 * | 1/2004 | Sauer et al. .................. | 74/552 |
| 6,688,638 | B1 * | 2/2004 | Schutz ..................... | 280/728.2 |
| 6,719,324 | B1 * | 4/2004 | Albers et al. ............... | 280/731 |

FOREIGN PATENT DOCUMENTS

| | | |
|---|---|---|
| EP | 1167132 | 1/2001 |
| EP | 1179457 | 2/2002 |
| FR | 2790044 | 8/2000 |
| GB | 2336135 | 10/1999 |
| WO | WO 01/72558 | 10/2001 |

* cited by examiner

*Primary Examiner*—David R. Dunn
*Assistant Examiner*—Laura B. Rosenberg
(74) *Attorney, Agent, or Firm*—Tarolli, Sundheim, Covell & Tummino LLP

(57) ABSTRACT

An assembly of a steering wheel base body (12) and a gas bag module (14), the gas bag module (14) being able to be detachably latched with the steering wheel base body (12). A group of first latching elements (18; 318) is provided on the gas bag module (14) or the steering wheel base body (12), and at least one second latching element (22; 322), able to be brought into reversible locking engagement with the first latching elements (18; 318), is provided on the steering wheel base body (12) or the gas bag module (14). When the assembly (12, 14) has been put together, the first latching elements and the at least one second latching element (18, 22; 318, 322) are arranged so as to be movable with respect to each other in an unlocking direction (R; R'). The first and second latching elements (18, 22; 318, 322) are designed such that through a movement of the second latching element (22; 322) relative to the first latching elements (18; 318) in the unlocking direction (R; R') all latching connections (18, 22; 318, 322) are released simultaneously in a non-destructive manner.

14 Claims, 6 Drawing Sheets

ASSEMBLY OF A STEERING WHEEL BASE BODY AND GAS BAG MODULE

TECHNICAL FIELD

The invention relates to an assembly of a steering wheel base body and a gas bag module.

BACKGROUND OF THE INVENTION

In such assembly, the gas bag module normally can be detachably latched with the steering wheel base body, a group of first latching elements being provided on the gas bag module or the steering wheel base body, and at least one second latching element, able to be brought into reversible locking engagement with the first latching elements, being provided on the other one of the steering wheel base body and the gas bag module.

For reasons of time-saving and cost effectiveness, gas bag modules are being fastened increasingly frequently in steering wheels by means of latching connections. Apart from ensuring a secure connection of the gas bag module with the steering wheel base body, these latching connections are also to be releasable in a simple manner, in order to be able to perform a maintenance on the gas bag module or exchange it. Whereas the fastening of a component by a latching connection can generally take place in a short operating step, in the majority of known latching connections the loosening of the latching connection requires considerably more time. The invention provides a remedy for this.

BRIEF SUMMARY OF THE INVENTION

According to the invention, an assembly of a steering wheel base body and a gas bag module is proposed, in which the gas bag module is detachably latched with the steering wheel base body by a latching connection. The connection is provided by a group of first latching elements and at least one second latching element, able to be brought into reversible locking engagement with the first latching elements. In the latched state of the assembly, the first latching elements and the at least one second latching element are arranged so as to be movable with respect to each other in an unlocking direction. The first and second latching elements are designed such that upon movement of the second latching element relative to the first latching elements in the unlocking direction all latching connections are released simultaneously in a non-destructive manner. In this arrangement, the second latching element preferably is designed to be so rigid that it is not deformed during the unlocking. Therefore, it is not necessary to release each latching connection individually, in order to remove the gas bag module from the steering wheel base body, but rather all the latching connections can be released simultaneously in one operating step, by only one of the latching elements being grasped at a central point and displaced.

The invention can of course also be used for fastening a gas bag module to components other than the steering wheel, which are fixed to the vehicle.

The unlocking takes place without a deformation of any of the latching elements and only on the basis of a movement of the latching elements with respect to each other. Preferably, the release of all latching connections takes place by a purely translatory movement.

Provision can be made that the group of the first latching elements is moved as a whole in the unlocking direction, i.e. no relative movement of the first latching elements takes place with respect to each other.

The steering wheel base body can be formed for example by a steering wheel skeleton, a mounting being provided in the hub region into which the gas bag module is inserted.

In a preferred embodiment of the invention, the first latching elements are formed by several latching hooks and the second latching element is formed by an elongated shaped part into which the latching hooks can engage. The shaped part can be fastened to the gas bag module or to the steering wheel base body, the latching hooks then being fastened to the respective other component.

The shaped part is preferably a curved wire. The wire can be mounted elastically in such a way that a latching connection with the latching hook can be achieved by simple insertion perpendicular to the unlocking direction of the gas bag module. The wire is constructed to be so inherently stable that it is not deformed during the unlocking.

In another embodiment, the shaped part is a rigid punched plate which in itself is immovable. The shaped part is preferably brought by elastic force into its locking position and held in it.

In the state when the assembly is put together, i.e. with the gas bag module inserted and engaged, the gas bag module can be movable in a direction perpendicular to the unlocking direction towards the steering wheel base body, without the latching connections being released. This allows the actuation of a horn, analogous to a conventional floating horn module.

On the steering wheel base body, an access can be provided which is able to be reached from the exterior and permits a local transmission of force to the latching element in the unlocking direction, the latter being provided for releasing all the latching connections. In this way, with the finished steering wheel in which the assembly is composed, e.g. by the introduction of a special tool from the exterior into the steering wheel base body, a movement of the latching element can be brought about locally in the unlocking direction, in order to release all the latching connections. For this, for example, one of the latching elements or the gas bag module can be acted upon.

Preferably, the group of the first latching elements and/or the at least one second latching element is fastened displaceably on the gas bag module or on the steering wheel base body. This has the advantage that the gas bag module does not have to be moved as a whole, but rather only one latching element or the group of latching elements has to be moved for unlocking. For this, the group of latching elements can be biased by one or more spring elements, so that the latching element or the group of latching elements can be returned into a locking position as soon as the action of force subsides. This development can also be used for locking. In this case, on insertion of the gas bag module into the steering wheel base body, the displaceably mounted latching element is firstly moved by a certain distance in the unlocking direction, whereby it is possible to move the gas bag module into its final position, and then the latching element is moved back contrary to the unlocking direction into its locked position which corresponds to a basic position, whereby the gas bag module is securely fastened in the steering wheel base body.

DETAILED DESCRIPTION OF THE PREFERRED EMBODIMENTS

Figure 1:
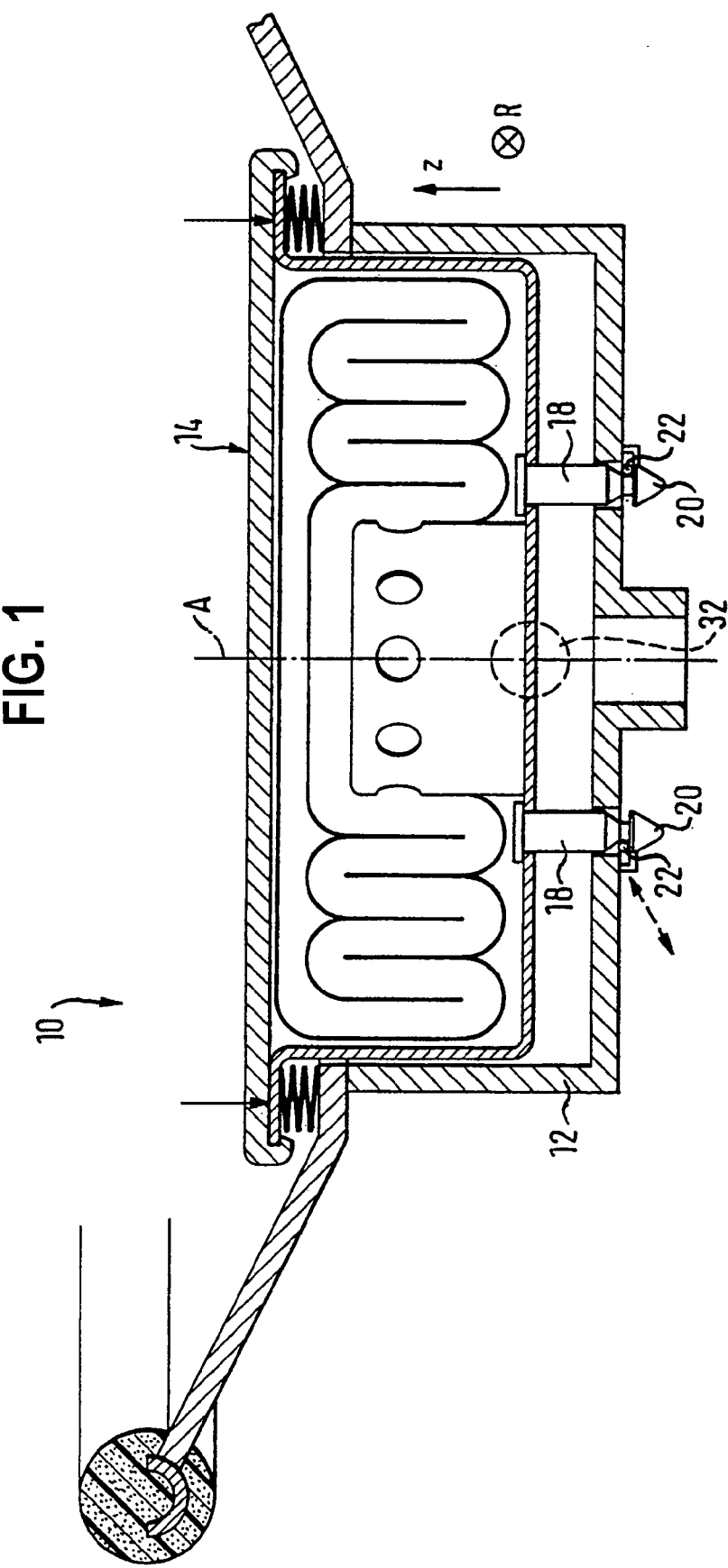
FIG. 1 shows a diagrammatic section through a steering wheel with an assembly of the invention in accordance with a first embodiment.

In FIG. 1 a steering wheel 10 is shown, which in a known development has a steering wheel base body 12, in the hub region of which a recess is constructed, into which a gas bag module 14 is inserted. The steering wheel base body 12 can be formed for example by a skeleton with or without a covering.

The gas bag module 14 is engaged detachably and reversibly on the steering wheel base body 12. For this, in the first embodiment shown in FIG. 1, a group of first latching elements 18 is fastened to the gas bag module, which are constructed here as pins with latching hooks 20. By way of example, two pins are shown, but more or fewer latching elements 18 can be provided, according to requirements.

The latching hooks 20 of the first latching elements 18 engage into at least one second latching element 22 which is fastened to the steering wheel base body 12 to form latching connections. In the examples shown here, the second latching element 22 is formed by a rigid wire 24, e.g. a round spring steel having a diameter of approximately 2.5 mm. In the composed state of the assembly which is shown, the steering wheel base body 12 is firmly connected with the gas bag module 14, because the latching hooks 20 of the first latching elements 18 are in engagement with the second latching element 22. The gas bag module 14 can therefore not be moved in positive Z-direction. In negative Z-direction, on the other hand, a displacement of the gas bag module 14 towards the steering wheel base body 12 is possible for actuation of a horn (not shown), in which, however, the latching connection is not released.

The second latching element 22 is constructed such that with a corresponding arrangement of the latching hooks 20 it is possible through a single, central, translatory movement of latching elements 18, 22 in an unlocking direction R, determined by the respective geometry, to bring all the latching elements 18, 22 out of engagement. This is achieved here in that the wire 24 is bent into a corresponding shape and can be grasped centrally.

Figure 2:
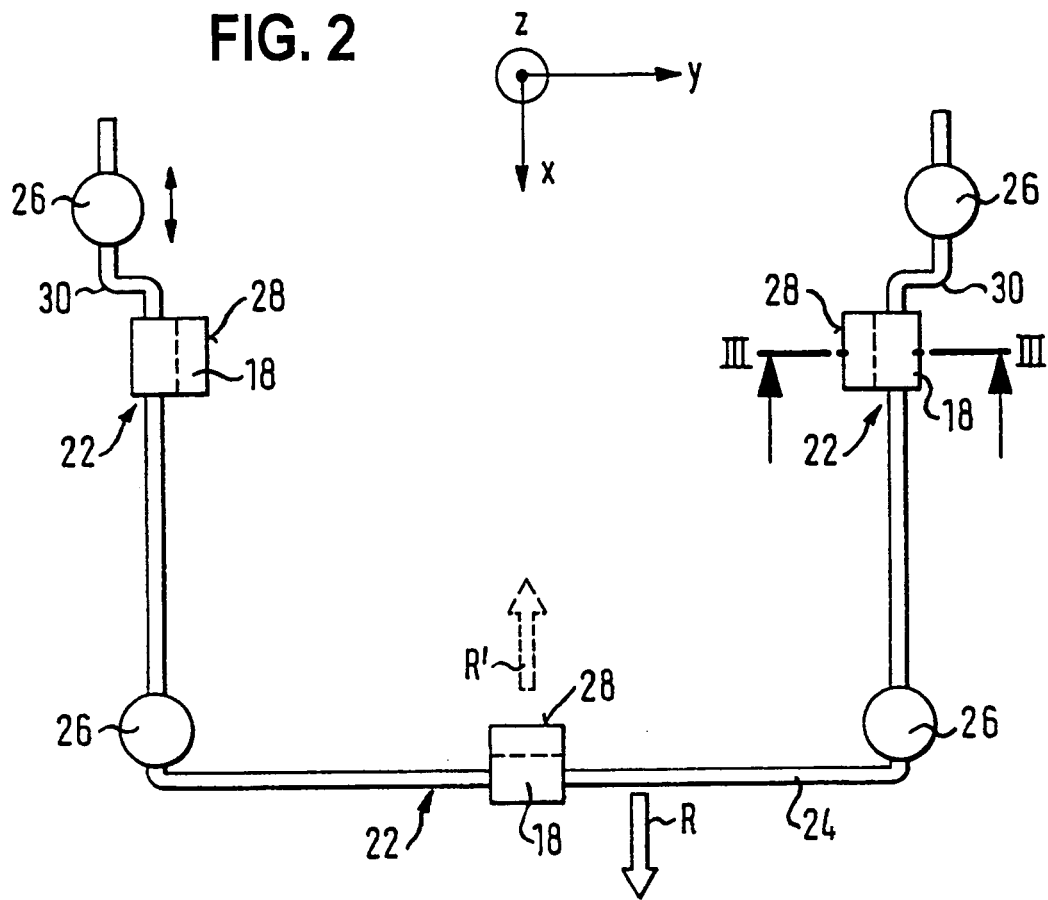
FIG. 2 shows a diagrammatic view of the latching elements of an assembly according to the invention.

A special possibility for the construction and arrangement of the latching elements 18, 22 is illustrated in greater detail in FIG. 2. The first latching elements 18 are constructed here as latching hooks 20 deformed to one side (see FIG. 3) and securely connected either with the gas bag module 14 or with the steering wheel base body 12. With the latching connection closed, the second latching element 22 engages into the latching hooks 20. The second latching element 22 is held here displaceably in guides 26 (indicated by arrows in FIGS. 1 and 3), which in turn are either firmly connected with the steering wheel base body 12 or with the gas bag module 14.

In the example shown here, the wire 24 is bent in a U-shape. Three first latching elements 18 are provided. The closed sides 28 of the latching hooks 20 are each directed to the interior of the "U". In each case a first latching element 18 is arranged on each arm and on the closed side of the "U". On each arm of the "U", above the first latching elements 18, the wire 24 has an outwardly directed bend 30.

The second latching element 22 engages into the latching hooks 20, so that the latching connections are closed. Through the several latching elements 18, 22 a stable fastening of the gas bag module 14, free from play, on the steering wheel base body 12 is ensured. A movement of the gas bag module 14 is only possible in negative Z-direction in this state, but not in positive Z-direction.

Through a translatory movement of the latching element 22 in the unlocking direction R, which lies perpendicular to the Z-direction, the latching elements 18, 22 can be brought out of engagement. In so doing, the latching element 22 moves in the plane designated by x-y. The wire 24 forming the second latching element 22 is not deformed in itself during the unlocking movement, but is only moved as a whole in a translatory manner. Also, the first latching elements 18 are constructed here so as to be rigid, so that they do not deform during the unlocking movement.

It is also possible to fasten the wire 24 rigidly and to hold the group of the first latching elements 18 (possibly by means of an interposed carrier element) displaceably. In this case, the unlocking direction is of course the negative direction R, indicated by R'.

In each case, through the application of a force on a single point, all the latching elements can be brought out of engagement.

In order to prevent an unintentional unlocking, the respectively displaceably mounted group of latching elements can be biased by a spring element into the basic position in which the latching elements are closed (see FIGS. 4 to 9).

Figure 3:
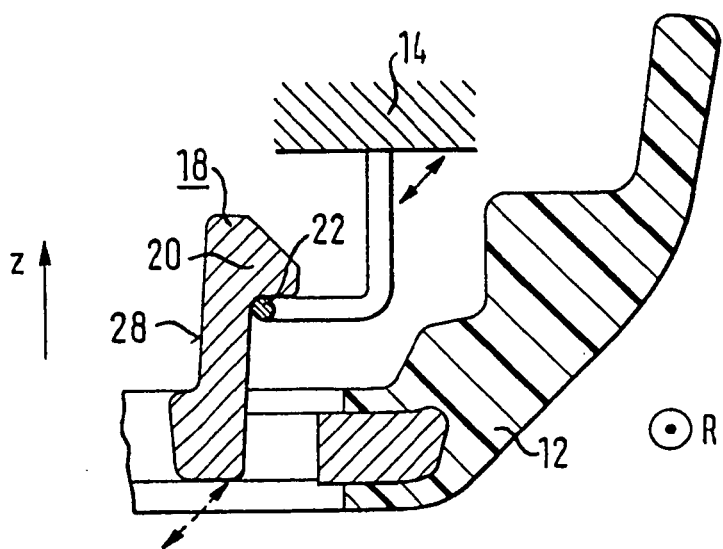
FIG. 3 shows a diagrammatic section along the line III—III of FIG. 2 through an assembly of the invention in accordance with a second embodiment.
Figure 4:
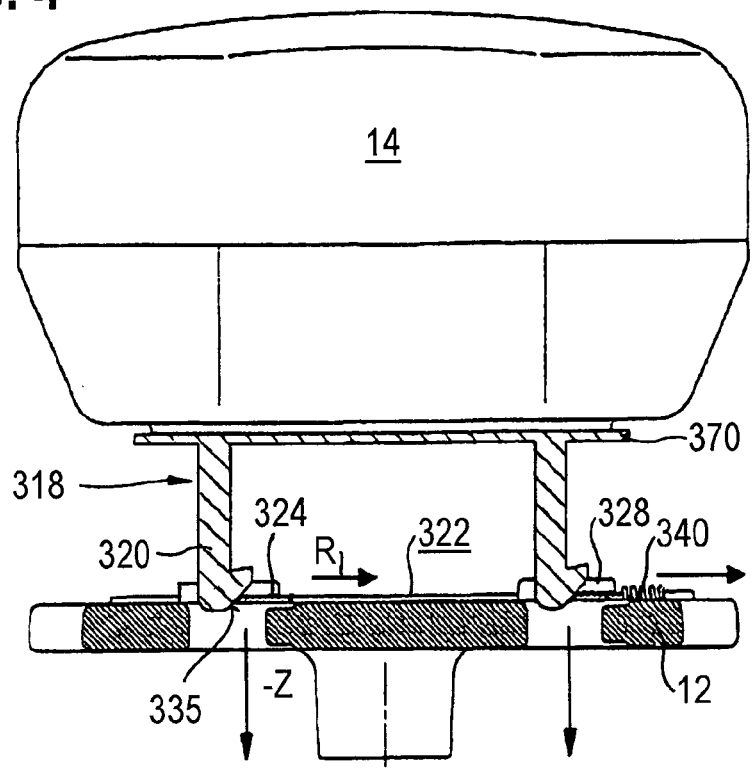
FIG. 4 shows a diagrammatic view of an assembly of the invention in accordance with a third embodiment of the invention, during the insertion of the gas bag module.

FIG. 3 shows a second embodiment of the invention, in which the group of first latching elements 18 is fastened to the steering wheel body 12 and the second latching element 22 to the gas bag module 14.

For conversion of the idea of the invention, it is irrelevant whether the group of first latching elements 18 is fastened to the gas bag module 14 or to the steering wheel base body 12, because only the interplay of the latching elements 18, 22 is essential. The example shown in FIG. 2 represents only one of many possible developments of the latching elements 18, 22.

Preferably, the steering wheel base body 12 and any covering arranged over it have a central access 32 which is able to be reached from the exterior, through which the movement of at least one latching element 18, 22 can be brought about by a tool (advantageously only by a special tool) in unlocking direction R, R' for central unlocking.

The latching elements 18, 22 can also be used as electrical contacts of the horn. In this case, they must be electrically insulated with respect to the gas bag module 14 and the steering wheel base body 12, e.g. by consisting of or being coated with an insulating material.

In a third embodiment shown in FIGS. 4 to 10, the second latching element 322 is constructed as a rigid frame-shaped plate 324, not movable in itself, e.g. as a punched plate. The plate 324 has a shape which allows it to be brought out of engagement with all the present first latching elements 318 simultaneously by a purely translatory movement. The plate 322 is constructed to be so rigid that during the unlocking process it is not deformed either in a plastic or elastic manner.

The plate 324 is held displaceably in guides 326 arranged on the steering wheel base body 12 in unlocking direction R against the restoring force of a spring element 340. In the embodiment shown, the spring element 340 is formed by a spiral spring fixed in a recess of the steering wheel base body 12. Arms 328 of the rigid guides 326, running in unlocking direction R, prevent a movement of the plate 324 in opposition to an insertion direction of the module (here, the direction −Z). In −Z-direction, the plate 324 is supported by the steering wheel base body 12. The guides 326 are open on one side, so that on assembly of the steering wheel the plate 324 can be simply placed into the guides 326.

The closed sides of the guides 326 form a stop 350 for the plate 324, which delimits a movement of the plate contrary to the unlocking direction R on the basis of the force exerted by the spring element 340. In the locking position (FIGS. 5 and 8), the left-hand edge 360, in the figures, of the plate 324 lies against the stops 350.

The first latching elements 318 are formed by latching hooks 320 fastened to the gas bag module 14, which have on their free end in each case a latching surface 330 and a sliding surface 335.

Figure 10:
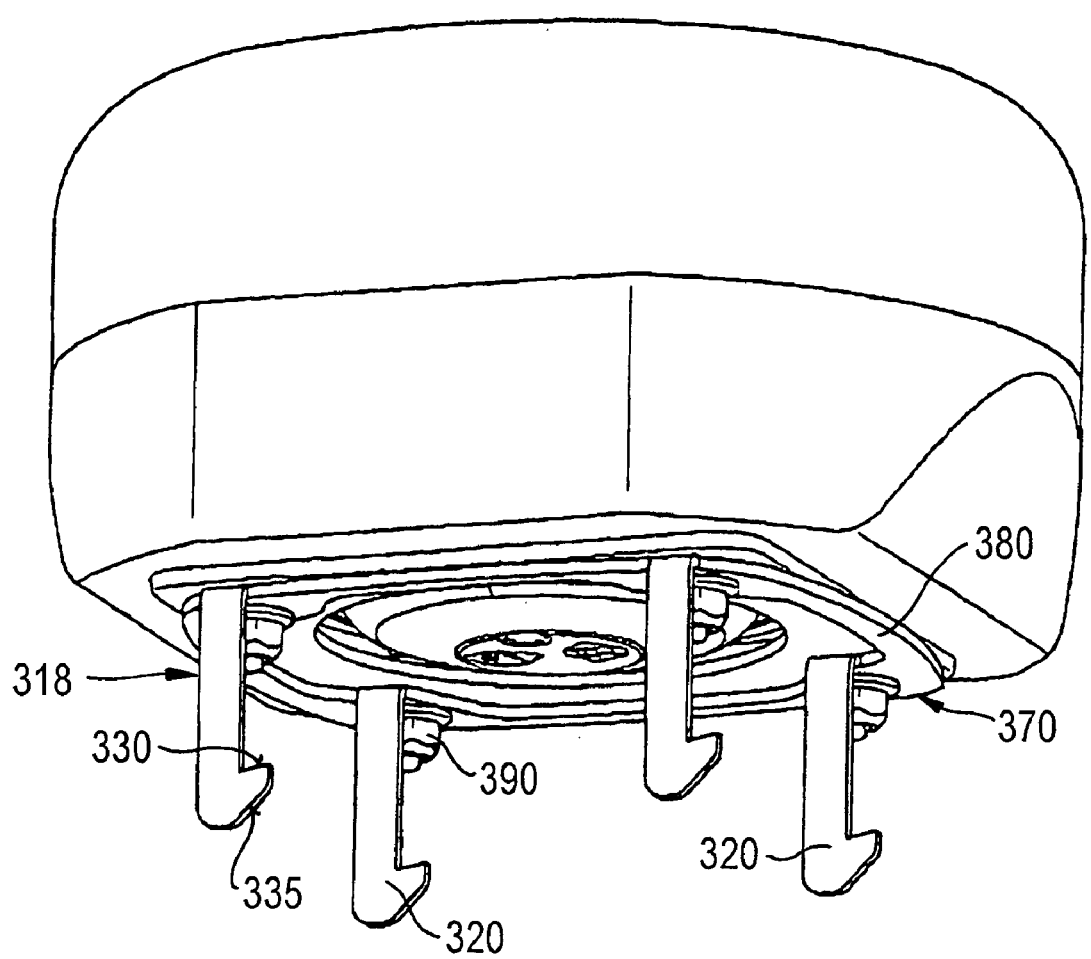
FIG. 10 shows a diagrammatic view of the gas bag module according to the third embodiment of the invention.

The latching hooks 320 are part of a carrier plate 370 which in addition has a substantially flat, frame-shaped base section 380 connected in one piece with the latching hooks 320, by means of which the carrier plate 370 is fastened for example via a screw connection 390 firmly to the gas bag module 14 (see FIG. 10). The carrier plate 370 is constructed as a sheet metal punched piece. The first latching elements 318 are bent around after having punched out the carrier plate, so that they project at right angles from the base section 380. The first latching elements 318 are constructed such that all the latching hooks 320 point in the same direction (see FIG. 10). The base section 380 can have a reinforcement function for the base of the module 14, e.g. in the case when the module housing or a gas generator carrier forming the base of the module consists of plastic. The carrier plate 370 can be provided with beads, fold portions, flanges or the like to increase the rigidity.

The plate 324 is constructed as a component separate from the gas bag module 14 and from the steering wheel body 12. In the example shown here, the plate 324 is connected with the steering wheel base body only by the mounting in the guides 326 and by the spring element 340, and with the gas bag module 14 only in the locked state by means of the abutment against the latching hooks 320.

In order to fasten the gas bag module 14 to the steering wheel base body 12, it is inserted into the steering wheel base body 12 in negative Z-direction −Z. Here, the sliding surfaces 335 of the latching hooks 320 come into contact with the plate 324, which is held in locking position by the spring element 340, and move the plate 324 with progressive insertion in unlocking direction R (see FIG. 4). The plate 324 is moved so far that the latching hooks 320 can move past the plate 324 in −Z-direction. The plate 324, however, remains in engagement here with the guides 326.

Figure 5:
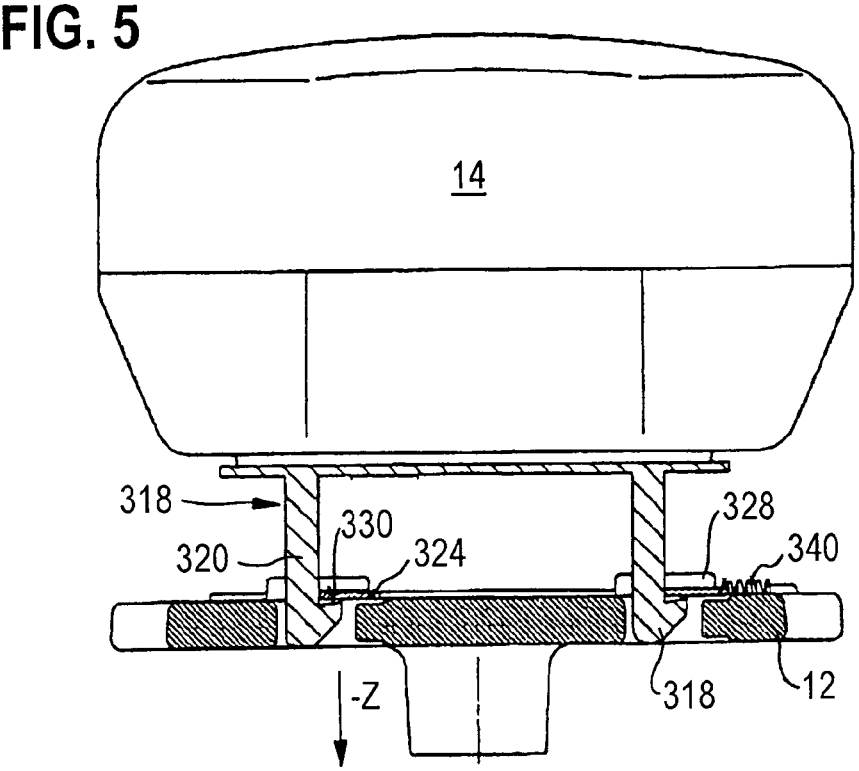
FIG. 5 shows a diagrammatic view of the assembly of FIG. 4 in a locked state.
Figure 6:
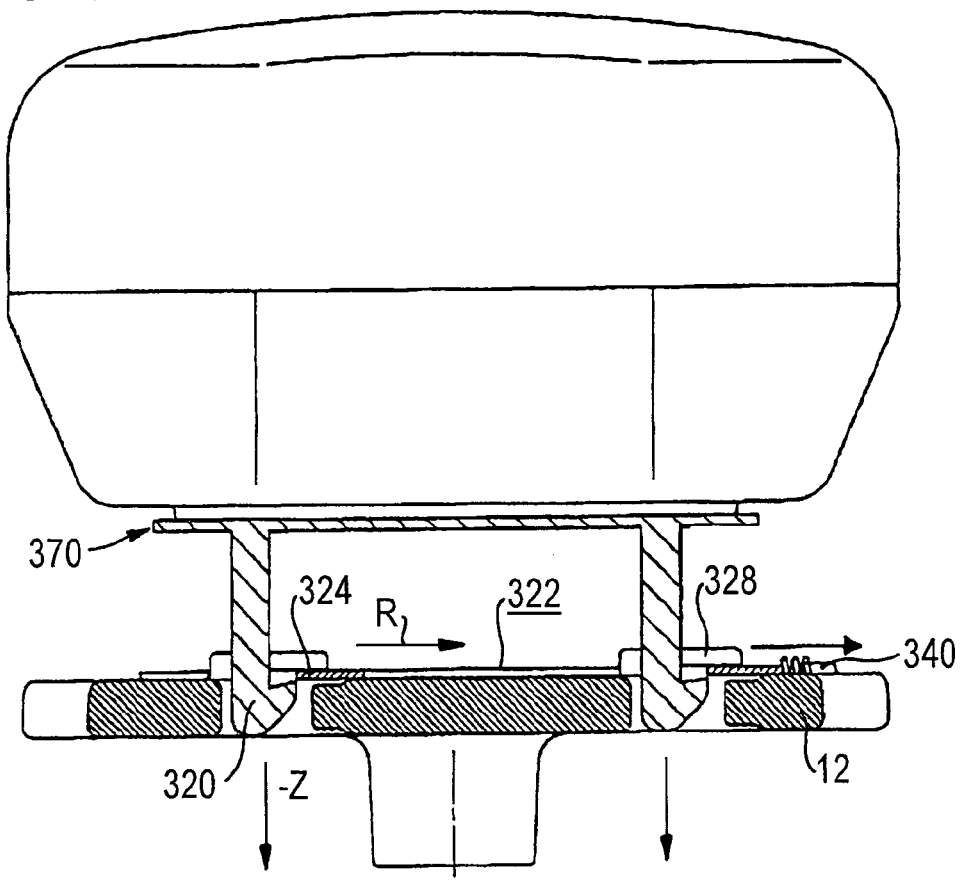
FIG. 6 shows a diagrammatic view of the assembly of FIG. 4 in an unlocked state.
Figure 7:
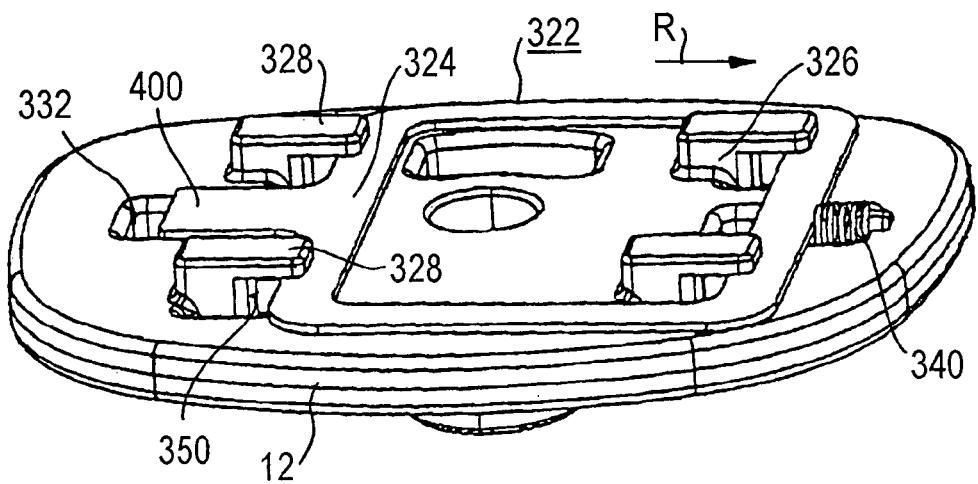
FIG. 7 shows a perspective illustration of the arrangement of the second latching element of the assembly of FIG. 4 on the steering wheel base body.
Figure 8:
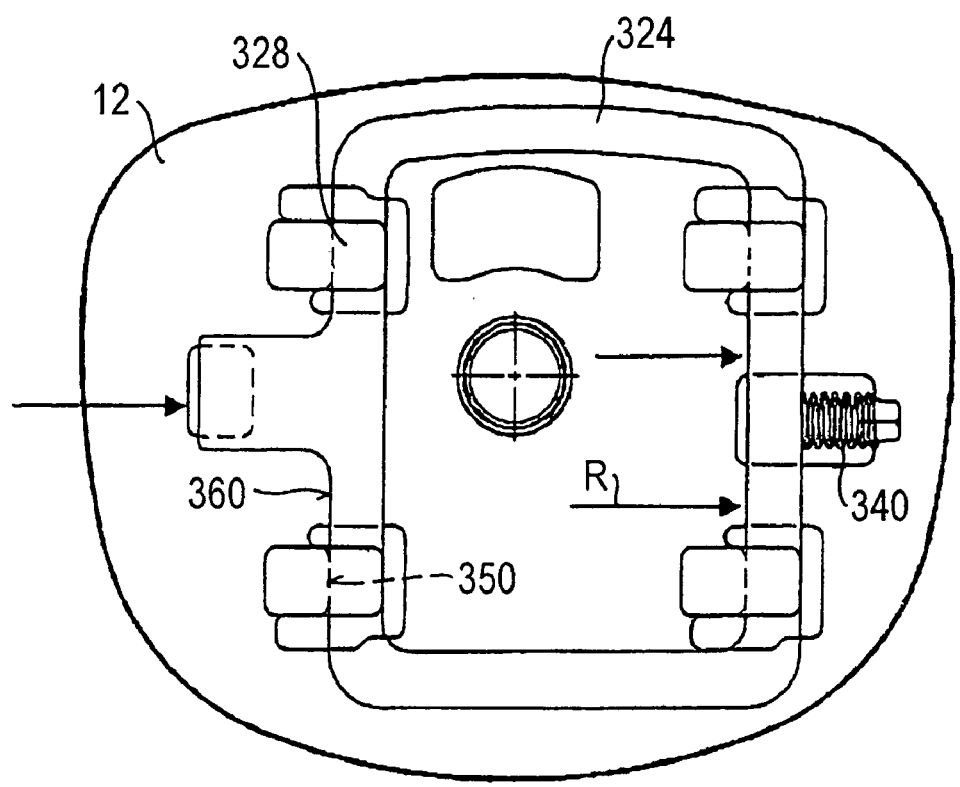
FIG. 8 shows the second latching element of FIG. 7 in locking position.
Figure 9:
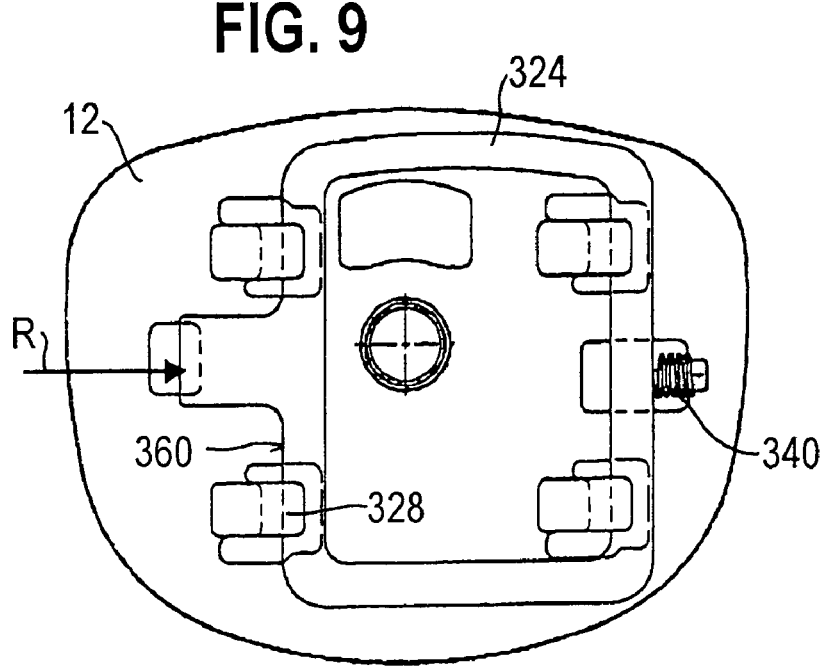
FIG. 9 shows the second latching element of FIG. 7 in unlocking position.

After the latching hooks 320 have passed the plate 324 in −Z-direction, the plate 324 moves, owing to the spring action, back into its locking position (see FIG. 5). The latching surfaces 330 of the latching hooks 320, on traction in positive Z-direction, now come into abutment against the plate 324, so that the gas bag module 14 is held back. All the first latching elements 318 in the locked state are directly in engagement with the second latching element 322. A further movement of the gas bag module 14 in −Z-direction by a specific distance, e.g. to actuate a horn, is possible.

For unlocking the latching connections, on the plate 324 shown here an extension 400 is provided on one side, which is accessible through a recess 332 in the steering wheel base body 12 from the exterior of the steering wheel, e.g. for a special tool. In the example shown here, the spring element 340 engages on the side opposite the extension 400 on the plate 324. The extension and the spring element may, however, also be arranged at a different site or may be constructed differently.

In order to detach the gas bag module 14 from the steering wheel, the plate 324 is displaced by means of the tool against the force of the spring element 340 into its unlocking position (see FIG. 9), in which the latching surfaces 330 of the latching hooks 320, with a movement in positive Z-direction, do not come in contact with the plate 324. In this position of the plate 324, the gas bag module 14 can be simply removed from the steering wheel base body 12 by a movement in Z-direction.

The latching hooks 320 of all the first latching elements 318 are released simultaneously by the displacement of the plate 324 in unlocking direction R. As all the latching hooks 320 point in the same direction, namely with the open side of the hook in unlocking direction R (see, for example, FIG. 6), all the latching connections can be released simultaneously by a single, purely translatory movement of the second latching element 322. A displacement path which corresponds to the extent of the latching surfaces 330 in unlocking direction R, is sufficient for this, so that only a short displacement path has to be provided for the second latching element 322.

The plate 324 is not deformed in an elastic or plastic manner either during production of the locking or on unlocking.

For the second latching element, a shape can be selected corresponding to the U-shape of the wire 24 or any other desired shape can be selected. All the other features can be realized as described above.

The plate 324, instead of being fastened to the steering wheel base body 12, can also be fastened to the gas bag module 14. The latching hooks 320 would then be arranged accordingly on the steering wheel base body 12.

The spring element 340 can also be formed by one or more plate springs or by an elastic buffer, e.g. of rubber, or else by a section of a foamed sheathing surrounding the steering wheel. Likewise, it is possible to stress the spring element 340 for unlocking not by pressure, as shown, but by traction. In this case, the spring element 340 can also be realized by an elastic band.

The invention claimed is:

1. An assembly comprising:
   a steering wheel base body (12) and a gas bag module (14),
   said gas bag module (14) being detachably latched with said steering wheel base body (12) by latching connections comprising a group of first latching elements (18; 318) and at least one second latching element (22; 322), able to be brought into reversible locking engagement with said first latching elements (18; 318),
   in a latched state of said assembly (12, 14) said first latching elements and said at least one second latching element (18, 22; 318, 322) being arranged so as to be movable with respect to each other in an unlocking direction (R; R'), said first and second latching elements (18, 22; 318, 322) being designed such that upon movement of said second latching element (22; 322) relative to said first latching elements (18; 318) in said unlocking direction (R; R') all latching connections (18, 22; 318, 322) are released simultaneously in a non-destructive manner, said gas bag module (14), in said state when said assembly (12, 14) is put together, being movable in a direction (−z) perpendicular to said unlocking direction (R; R') towards said steering wheel base body (12), without said latching connections being released.

2. The assembly according to claim 1, characterized in that said first latching elements (18) are formed by several latching hooks (20) and said second latching element (22) is formed by at least one elongated shaped part, into which said latching hooks (20) can engage.

3. The assembly according to claim 2, characterized in that said shaped part is a curved wire (24).

4. The assembly according to claim 2, characterized in that said shaped part is a rigid plate.

5. The assembly according to claim 4, characterized in that said plate (322) is a sheet metal punched part.

6. The assembly according to claim 4, characterized in that said plate (322) is shaped like a rectangle.

7. The assembly according to claim 1, characterized in that on said steering wheel base body (12) an access (32; 332) is provided, which is able to be reached from the exterior and allows a transmission of force in said unlocking direction (R, R') to said latching element (22; 322) that is provided for releasing all of said latching connections.

8. The assembly according to claim 1, characterized in that said group of first latching elements (18; 318) is displaceably fastened to one of said gas bag module (14) and said steering wheel base body (12).

9. The assembly according to claim 1, characterized in that said at least one second latching element (22; 322) is displaceably fastened to one of said gas bag module (14) and said steering wheel base body (12).

10. The assembly according to claim 1, characterized in that said movement for releasing said latching elements is a purely translatory movement.

11. An assembly comprising:
a steering wheel base body (12) and a gas bag module (14),
said gas bag module (14) being detachably latched with said steering wheel base body (12) by latching connections comprising a group of first latching elements (18; 318) and at least one second latching element (22; 322), able to be brought into reversible locking engagement with said first latching elements (18; 318),
said at least one second latching element (22; 322) being displaceably fastened to one of said gas bag module (14) and said steering wheel base body (12) and being acted upon by a spring element (340), which endeavors to hold said second latching element (322) in a locking position,
in a latched state of said assembly (12, 14) said first latching elements and said at least one second latching element (18, 22; 318, 322) being arranged so as to be movable with respect to each other in an unlocking direction (R; R'),
said first and second latching elements (18, 22; 318, 322) being designed such that upon movement of said second latching element (22; 322) relative to said first latching elements (18; 318) in said unlocking direction (R; R') all latching connections (18, 22; 318, 322) are released simultaneously in a non-destructive manner.

12. The assembly according to claim 11, characterized in that for said displaceably fastened second latching element (322) at least one stop (350) is provided, against which said second latching element (322) lies in its locking position.

13. An assembly comprising:
a steering wheel base body (12) and a gas bag module (14),
said gas bag module (14) being detachably latched with said steering wheel base body (12) by latching connections comprising a group of first latching elements (18; 318) and at least one second latching element (22; 322), able to be brought into reversible locking engagement with said first latching elements (18; 318),
said first latching elements (18; 318) have one latching hook (20; 320) each, which all point in the same direction,
in a latched state of said assembly (12, 14) said first latching elements and said at least one second latching element (18, 22; 318, 322) being arranged so as to be movable with respect to each other in an unlocking direction (R; R'),
said first and second latching elements (18, 22; 318, 322) being designed such that upon movement of said second latching element (22; 322) relative to said first latching elements (18; 318) in said unlocking direction (R R') all latching connections (18, 22; 318, 322) are released simultaneously in a non-destructive manner.

14. An assembly comprising:
a steering wheel base body (12) and a gas bag module (14),
said gas bag module (14) being detachably latched with said steering wheel base body (12) by latching connections comprising a group of first latching elements (18; 318) and at least one second latching element (22; 322), able to be brought into reversible locking engagement with said first latching elements (18; 318) and at least one second latching element (22; 322), able to be brought into reversible locking engagement with said first latching elements (18; 318),
in a latched state of said assembly (12, 14) said first latching elements and said at least one second latching element (18, 22; 318, 322) being arranged so as to be movable with respect to each other in an unlocking direction (R; R'),
said first and second latching elements (18, 22; 318, 322) being designed such that upon movement of said second latching element (22; 322) relative to said first latching elements (18; 318) in said unlocking direction (R; R') all latching connections (18, 22; 318, 322) are released simultaneously in a non-destructive manner,
said second latching element (22; 322) being designed to be so rigid that it is not deformed during unlocking.

* * * * *